United States Patent [19]

Struyk

[11] 3,908,577

[45] Sept. 30, 1975

[54] LAND AND WATER TRANSPORT

[76] Inventor: Richard Struyk, 1918 Columbia Pike, Arlington, Va. 22204

[22] Filed: Apr. 11, 1974

[21] Appl. No.: 460,021

[52] U.S. Cl. .................... 115/1 R; 9/2 S; 114/28; 114/61; 114/70; 114/77 A
[51] Int. Cl.² .......................................... B60F 3/00
[58] Field of Search ......... 114/60, 70, 61, 28, 77 R, 114/77 A; 9/2 R, 2 C, 2 S, 2 F; 115/1 R

[56] References Cited
UNITED STATES PATENTS

| 795,779 | 7/1905 | Mayo | 9/2 R |
|---|---|---|---|
| 1,790,094 | 1/1931 | Hollis | 9/2 S |
| 2,898,877 | 8/1959 | King | 114/60 |
| 3,067,439 | 12/1962 | Brush | 9/2 F X |
| 3,414,917 | 12/1968 | Harrington | 9/1 T |
| 3,665,885 | 5/1972 | Iaves | 114/61 |
| 3,731,644 | 5/1973 | Bradt | 114/61 |

FOREIGN PATENTS OR APPLICATIONS

| 1,000,068 | 8/1965 | United Kingdom | 9/2 F |
|---|---|---|---|
| 1,194,697 | 6/1970 | United Kingdom | 9/2 F |
| 1,093,216 | 11/1954 | France | 9/2 S |
| 1,251,176 | 9/1967 | Germany | 9/2 S |

*Primary Examiner*—George E. A. Halvosa
*Attorney, Agent, or Firm*—Frank P. Cyr

[57] ABSTRACT

A plurality of buoyant members adapted to be secured to one another to construct a floating platform which may be outfitted with a suitable power source mounted on the stern thereof to provide a pleasure craft for cruising on a body of water or the platform may be employed to support thereon a self powered mobile recreational vehicle. The components employed for forming the aforesaid platform consist of relatively light weight buoyant structural members which will enable the same to be easily handled for assembly for supporting and converting a self powered land vehicle such as a mobile home into an amphibious vehicle. The structural members, aforesaid, and the means for securing the members to one another enable the same to be easily assembled at site to construct a floating platform and when disassembled the structural members may be easily stored aboard the mobile recreational vehicle or mounted on a trailer for transport from one location to another to there present a self-contained mobile amphibious home system, either ashore or afloat.

8 Claims, 18 Drawing Figures

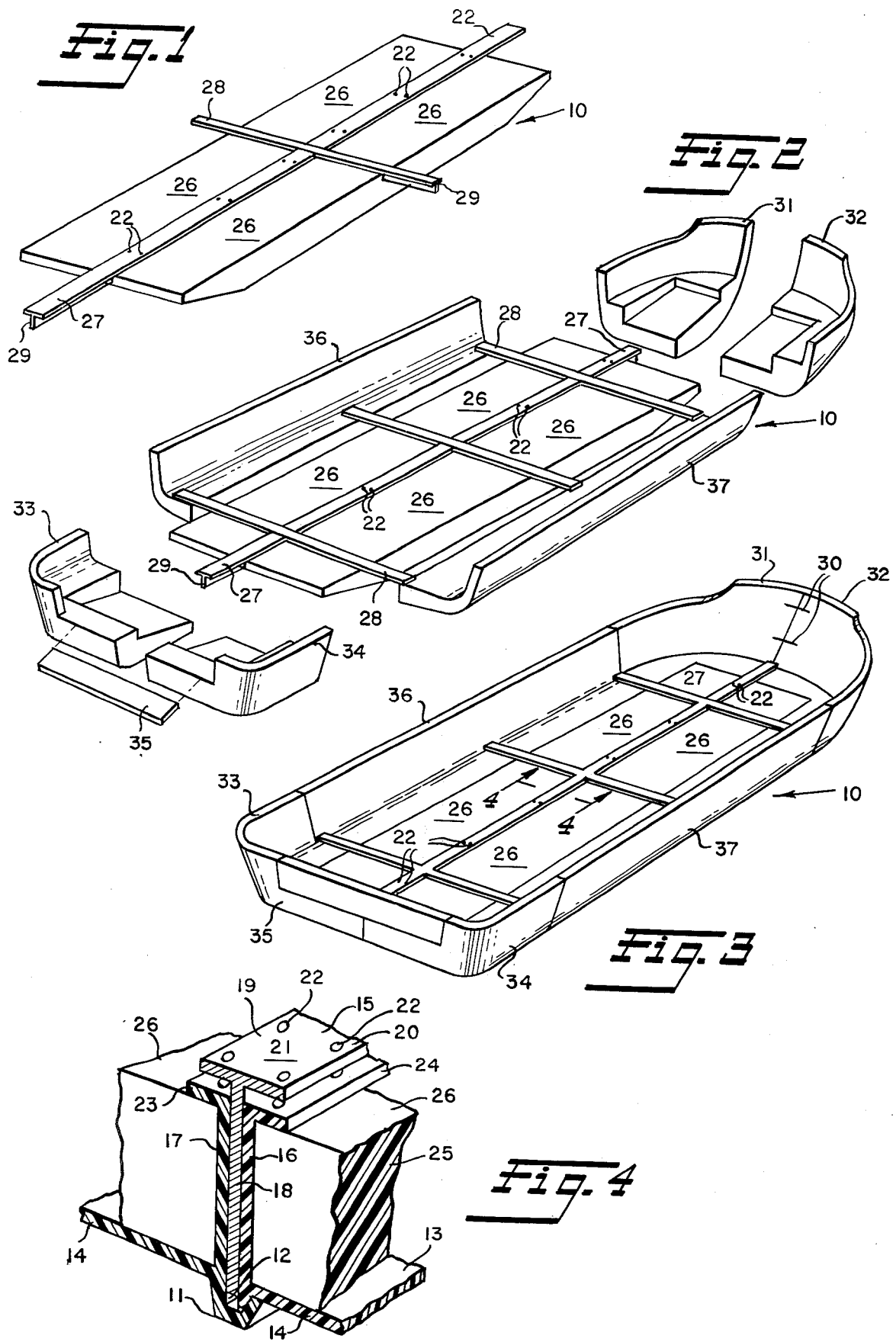

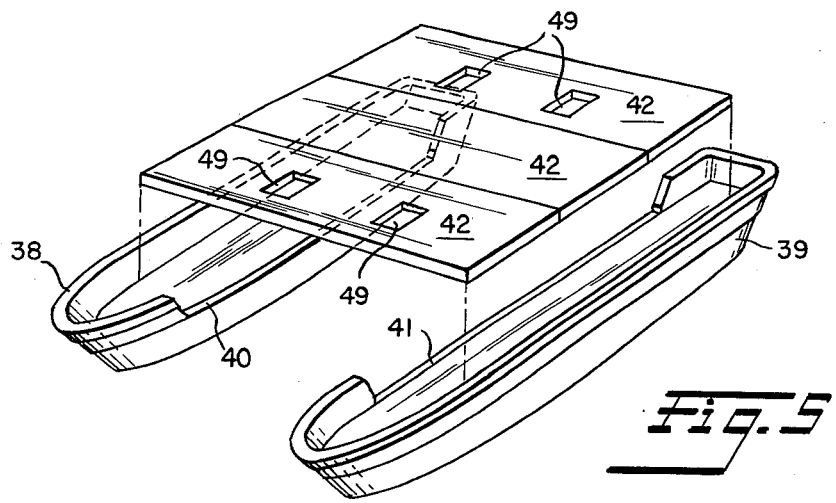
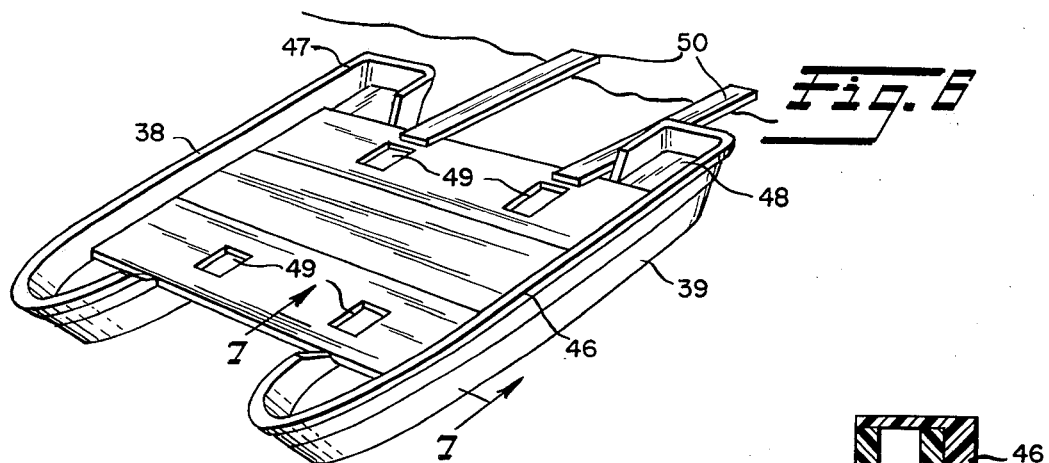
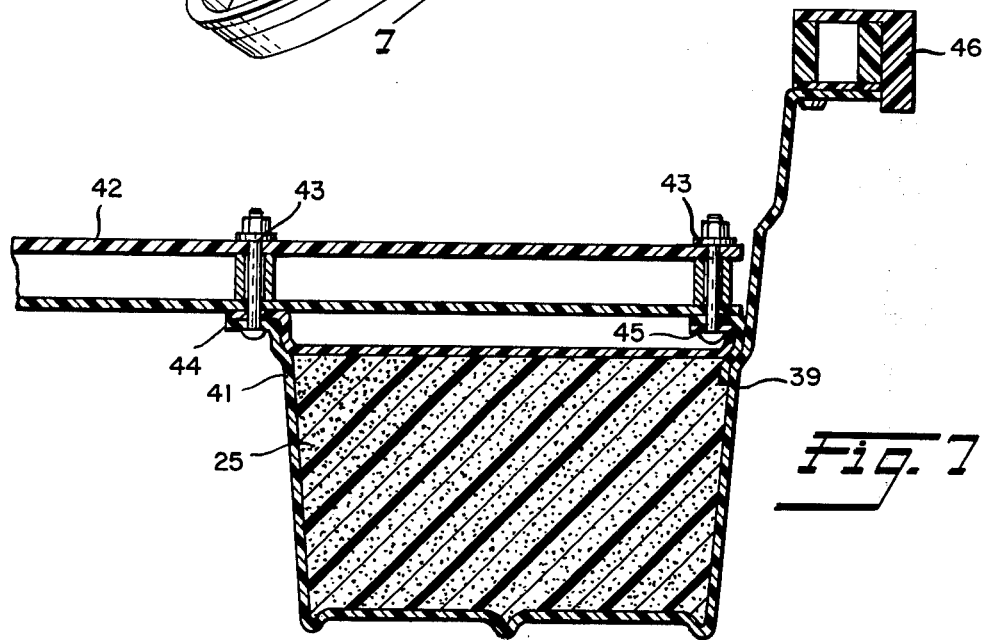

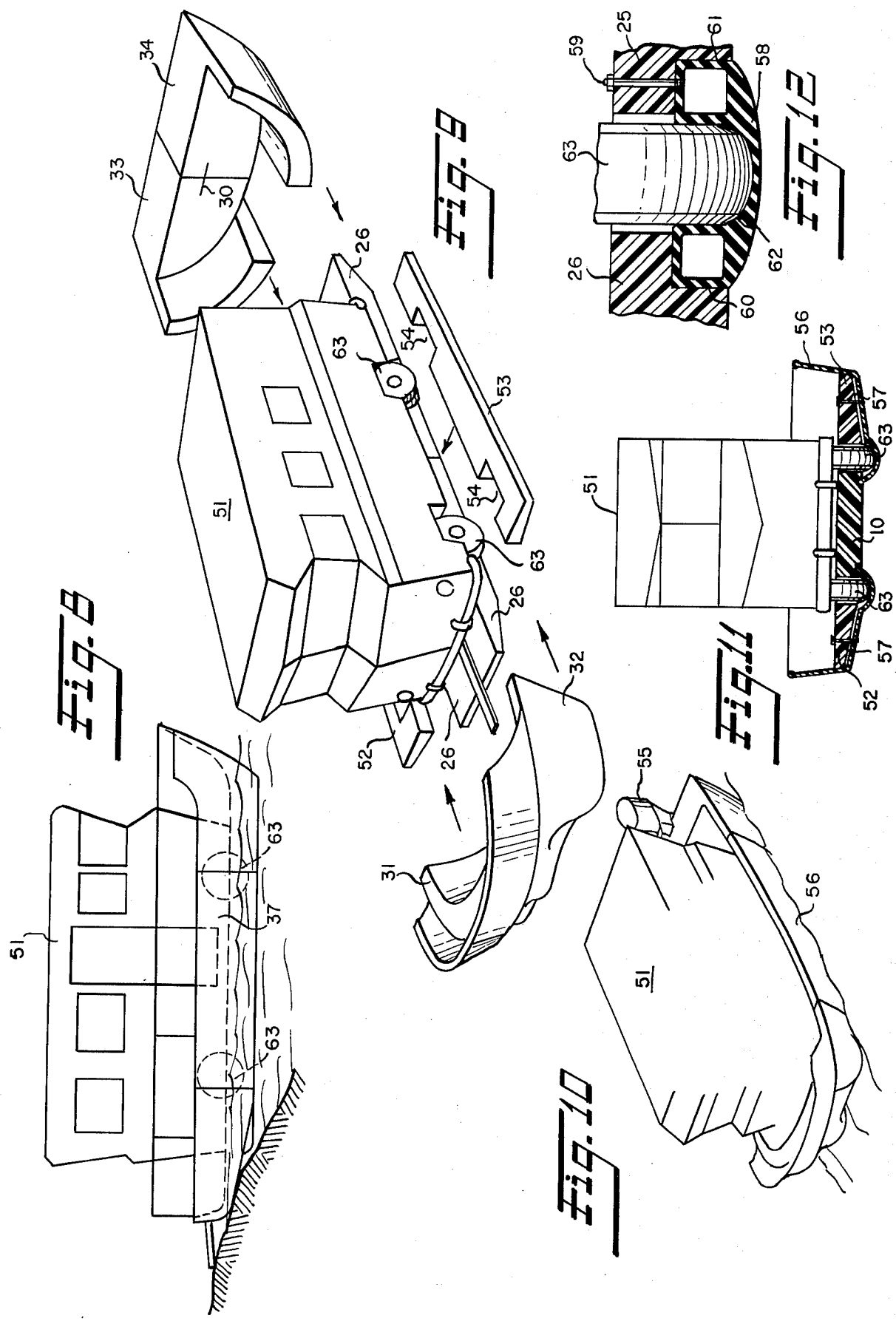

LAND AND WATER TRANSPORT

BACKGROUND OF THE INVENTION

With the advent of more and more self powered mobile homes used primarily as recreational vehicles for vacation living, camping, etc., the use of the conventional land self-propelled mobile home is restricted to use thereof on land only. This, of course, limits the employment of such a vehicle. As can be appreciated, if such a land vehicle can be easily converted into an amphibious vehicle, the employment thereof for recreational or other purpose is greatly increased since one desiring to spend some time on a lake or other body of water can easily do so by utilizing a means whereby the vehicle can be carried on a floatation platform, thus enabling the same to function as a floating mobile recreational vehicle having all of the living accommodations usually found in such a vehicle.

It is not uncommon to find one owning both a mobile home and a boat. However, the expense of owning both a boat and a mobile home entails considerable expense for the maintenance of both structures. Also, in most instances, an owner of a mobile home and a boat usually uses but one of these structures which necessitates the docking of the boat when only the mobile home is used. Conversely, if only the boat is used, the mobile home is left parked in some location near a body of water. Thus, the provision of a means whereby a mobile home can be easily and effectively converted into an amphibious vehicle increases the use of the mobile home and permits for the mobile home to be employed or used not only on land but equally as well on water. The crossing of a body of water is usually accomplished by travelling over a bridge structure which is positioned at predetermined points so that it becomes necessary to drive to the bridge to cross the body of water. However, if a simple structure can be provided for converting a land vehicle to one which is amphibious, this would eliminate the necessity of driving to a bridge, possibly many miles away, in order to effect the crossing of the body of water.

In the past, numerous attempts have been made to provide a means whereby a self-propelled vehicle such as a mobile home, or the like, adapted primarily for land use could be converted into an amphibious vehicle. However, all such prior attempts have not met with any degree of success insofar as the purchasing public is concerned. This can probably be attributed to the fact that until now, no feasible structures had been presented whereby the conversion of a land vehicle to one which is amphibious could be effected with a minimum of components and also presented to the purchasing public as a kit which can be easily and quickly applied to a land vehicle to convert the same to one capable of floatation and propulsion over a body of water.

The past attempts to convert a land vehicle to one capable of travel over water have included complex and sometimes cumbersome equipment, unable to be easily stored or carried when the vehicle is used on land only. Also, the prior attempts made in this field to solve the problem have required a drastic revision of the self-propelled land vehicle in order to convert the same to an amphibious vehicle. The above difficulties in the conversion of a land vehicle to an amphibious vehicle may well have resulted in a non-acceptance by the purchasing public of what has been made available for this purpose thus far. One reason being the costs for the manufacture and installation of a plurality of components capable of converting a land vehicle to one which is amphibious. Also, in the past, the manner of transporting the components forming the floatation members has resulted in the modification of certain parts of the vehicle in order to accommodate the floatation members when the vehicle is used on land only.

Thus, for the above set forth reasons, and possibly others, the owner of a mobile self powered vehicle has refrained from attempting to convert the land vehicle to one which is also amphibious.

With the above in mind, it is the primary object of the invention to provide a minimum number of floatation members which may be easily and quickly assembled to form a floatation platform which may be used in the nature of a conventional outboard powered craft for outings and the like or to be employed to support a mobile land vehicle such as a self powered mobile home.

Another object of the invention is to provide a plurality of buoyant members which may be conveniently secured to an existing land vehicle without materially altering the structure of such a vehicle to thus enable the transportation of such buoyant members when the vehicle is used for land transportation.

Another object of the invention is to provide a simple yet effective manner in which all of the components forming the floatation platform may be securely fastened to one another to provide a rigid structure for the platform.

Another object of the invention is to provide an effective yet simple manner in which the motive power for the land vehicle as well as the steering mechanism of such a vehicle may be used for propulsion and steering of the platform upon which it is being supported.

Another object of the invention is to provide a variety of arrangements for the floatation platform whereby there is presented to the user of such a platform a variety of choices of equipment he may select from in order to enable the conversion of the land vehicle to one that is amphibious.

Another object of the invention is to provide an amphibious vehicle including wheel fairing structure for covering the lower portion of the wheels of the vehicle during operation thereof as an amphibious vehicle to improve the water flow around the vehicle.

Other objects and features of the invention will become apparent as the description proceeds, especially when taken in conjunction with the accompanying drawings, illustrating several forms of the preferred embodiments of the invention.

DESCRIPTION OF THE DRAWINGS

FIG. 1 is a perspective view showing a platform with securing members thereon for attachment of the platform to other components to form a floatation platform.

FIG. 2 is a perspective view with parts shown disassociated of a floatation platform.

FIG. 3 is a perspective assembly view of the structure shown in FIG. 2 of the drawings.

FIG. 4 is a section taken on line 4—4 of FIG. 3 of the drawings, looking in the direction of the arrows.

FIG. 5 is a modified form of a floatation platform showing the same prior to the assembly of all the components to complete the platform.

FIG. 6 is a perspective view showing the modification of FIG. 5 in assembled relationship and showing ramp means whereby a vehicle may be driven onto the floatation platform.

FIG. 7 is an enlarged section taken on line 7—7 of FIG. 6, looking in the direction of the arrows.

FIG. 8 is a side elevation showing a mobile home vehicle driven onto the floatation platform shown in FIG. 3 of the drawings.

FIG. 9 is a view showing the structure of FIG. 10 during one stage of attaching the floatation platform to a vehicle with parts shown disassembled.

FIG. 10 is a perspective view of the assembly of FIG. 9 and showing the manner in which a vehicle is supported on the floatation platform.

FIG. 11 is an end view showing the manner of applying a cover over the wheels of the vehicle which extend below the floatation platform.

FIG. 12 is a modified form of a wheel cover for the vehicle wheels which would normally extend below the floatation platform.

DESCRIPTION OF THE PREFERRED EMBODIMENTS

Figure 13:
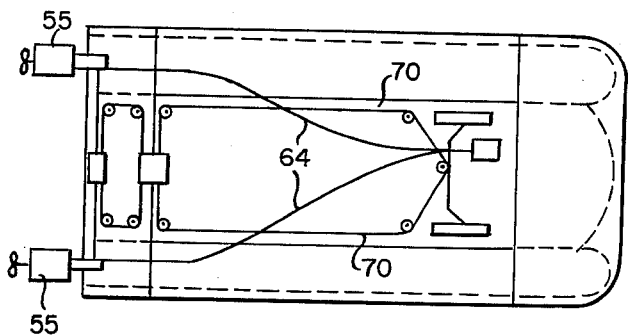
FIG. 13 is a diagrammatic view of the steering and propulsion controls for the floatation platform.

In the ensuing description of the invention the term "flotation platform" will be used to encompass a number of various structural formations capable of providing a floating structure capable of being used for a variety of purposes, such as, a pleasure craft for boating, and when such use is made, chairs, tables, etc. may be placed on board the floating platform to accommodate the people on board the floating platform. The platform, if provided with the required propulsion means, such as outboard motors of known type, can be used to pull water skiers. Also, while the placing on board of a self-propelled motor vehicle has previously been referred to, it is obvious that other vehicles, such as a trailer, tractor, etc. may be supported on the structure of the present invention for travel thereof over a body of water.

Referring now to the drawings, there is shown therein several modifications of the inventive concept of the invention. Essentially, the basic thought behind this inventive concept is to present a variety of schemes whereby a floatation platform may be erected with a minimum of effort to thus afford to the user thereof a variety of use of this equipment.

Similar references will be used throughout the description of the invention to designate like parts throughout the several views of the drawings.

Referring now to FIGS. 1 to 3 inclusive of the drawings, there is shown therein one modification of the invention which will provide a floatation platform capable of accomplishing the results set forth in the above objects of the invention. Numeral 10 designates the central floatation member which may be in the nature of a surf board, that is, the same comprises a shell molded or otherwise formed of a suitable plastic material or metal and the same filled or substantially filled with a foam material such as polyurethane or the like to thus provide buoyancy to the structure. The floatation member 10 may be made integral or comprise a number of sections which may be joined together in a manner to be described more fully hereinafter.

Referring now more particularly to FIG. 4 of the drawings, there is shown there in a novel manner of securing together the various components forming the floatation platform.

In the formation of each of the components employed for forming the floatation platform, one component, referred to as the female portion of the structure comprises a downwardly directed shallow area designated at 11. In the formation of the various components for the floatation platform, one of each section will be formed with the aforesaid shallow area whereas the section to be joined therewith will be provided with a rib 12 depending downwardly or outwardly from the remainder of the hull or adjacent member 13 or other portion of the section forming the floatation platform.

The manner for securing the various components forming the floatation platform is of novel construction. Referring again to FIG. 4 of the drawings, there is shown therein two sections, 10, which are to be secured together. Necessarily, the floatation members 10 have been pre-formed and the same comprises an outer shell 14 molded or otherwise formed of a suitable plastic or other material and filled or partially filled with a suitable foamed plastic material to enhance the buoyancy thereof. Again referring to FIG. 4 of the drawings, the shallow area 11 is of such dimension as to accommodate therein the rib 12 which is formed on the next adjacent floatation member 26. As shown, the rib 12 is formed as an integral part of the shell portion 14, although it is obvious the same could be formed separately therefrom and secured thereto in any known manner to accomplish the desired results. In the formation of each of the components of the floatation members, the shell 14 which is to form the hull portion of the platform or any other portion of the platform is each provided with a male and a female area. The male area comprising the rib 12 formed on one of the components, whereas the next adjacent component to which the same is to be secured, is provided with a female area 11. In assembling the various components together to form a floatation platform, the components are brought into their respective position and with the rib 12 positioned within the area 11, a fastening member 15 in the nature of a T, is forced into the area defined between the walls 16 and 17 of shells 14. The fastener 15 has a depending leg portion 18 which, when the fastener is driven between the walls 16 and 17 of shells 14, the same will frictionally engage therewith to retain the adjacent sections in assembled relationship. A pair of wings 19 and 20 extend on either side of the head portion 21 and suitable openings 22 are formed in the head 21 to receive fastener means therein for securing the fastener to like wing members 23, 24 which are formed integral with walls 16 and 17.

As stated previously, the shell or hull portion 14 is molded of a suitable plastic material and while molding the shell, the walls 16 and 17 as well as the wings 23 and 24 are simultaneously formed so as to present an integral structure which will add rigidity to the components. A suitable foam 25, such as polyurethane or the like, extends within the area defined by the walls of the shell. The shell may be filled with the aforesaid material, or if desired, a thinner layer of the foam extending within the shell area. As can be appreciated, the amount of foam material within each shell component will determine the buoyancy thereof. In instances where the shell is not filled with the aforesaid foam material, the unfilled area may be used to store various items carried on board the floatation platform.

Referring again to FIG. 1 of the drawings, the floatation member 10 comprises a generally rectangularly shaped surf board like structure which may be formed integral or consisting of a number of components 26, 27, 28, 29, each constructed with the fastener members shown and described with particularity with respect to FIG. 4 of the drawings. That is, each component is provided with a male and female area and cross beams 27 and 28 are each formed with leg portions 29 extending the length of the beams and function to secure the components of the floatation platform in the same manner as that previously described with respect to the leg portion 18 of FIG. 4. The leg portions 29 on beams 27 and 28 are adapted to be force fitted between the walls 16 and 17 of the joined adjacent components and secured to the wing elements 23, 24 formed along one edge of each of the components. Once the legs on the beams have been inserted between the walls 16 and 17, and driven thereinto, suitable fastener means may be placed in the openings 22 to secure the elements together and to retain them in assembled relationship. If desired, suitable gasket means may extend between the components to be joined together, as aforesaid, in order to insure a liquid tight connection between the adjacent components as well as to provide for a wear surface between the joined parts. The bow and stern portions of the craft are formed of two components each of which are held together by means of any suitable securing means such as a tie-rod 30 or the like, which span the two adjacent sections of both the bow and stern. The bow sections 31 and 32 are each molded to the desired configuration and each have incorporated therein the required foam to render the same buoyant. The stern sections 33, 34 are likewise molded to the desired configuration with a foam material incorporated therein. Tie-rods 30 also span the area between the adjoining sections of the stern components to retain these sections in assembled relationship. If desired, a ramp 35 may be pivotally secured to the stern sections 33, 34 so as to permit easy access to the interior of the shell from the stern thereof. The sides 36 and 37 are also molded or otherwise formed to the desired configuration and are secured to the next adjacent components in the manner previously described with respect to FIG. 4 of the drawings. As can be seen more clearly in FIGS. 2 and 3 of the drawings, the outer extremities of the beams 27 and 28 extend over a portion of bow, stern and side sections of the craft. To add rigidity to the craft suitable securing means extend through the openings 22 formed in the beams and engage with portions of these sections to assist in retaining these components in assembled relationship. The craft shown in FIG. 3 of the drawings can be used as such for purposes of navigation over a body of water. An outboard motor of known construction may be secured in any manner to the stern of the craft and the same used as a pleasure craft. Chairs, tables, etc. may be placed on the deck of the craft for use by the occupants thereof.

Referring now to FIGS. 5 to 7 of the drawings, there is shown therein a modified version of a floating platform which may be employed not only as a pleasure craft but also capable fo supporting thereon a vehicle whether the same is self powered or one hauled by another vehicle such as a trailer. Shown in FIGS. 5 to 7 of the drawings is a pontoon type craft comprising a set of pontoons 38, 39. The pontoon members are molded or otherwise formed to the desired configuration and comprise a shell formed of plastic or similar material with a foam material 25 placed within the shell members. The inner walls 40 and 41 of each pontoon are cut away so as to leave an area of surface for supporting a plurality of plankings 42. The plankings are formed of any suitable material and are adapted to span the area between the pontoon structures to form a platform surface therebetween. The plankings are each secured to the pontoons by means of suitable fastener means 43, which extend between a lip 44 formed along the upper portion of the side wall 41 and a lip 45 formed interiorly of the outer wall of the pontoon. A suitable scuff plate 46 is provided along the upper portion of the outer wall of the pontoon to prevent damage to the pontoon when docking the craft. As can be seen more particularly in FIG. 6 of the drawings, wells 47 and 48 are provided in the stern of each pontoon which will permit securing a suitable outboard type motor for propelling the craft. The craft shown in FIGS. 5 to 7 of the drawings may be used as a pleasure craft with room on the platform formed by the aforesaid plankings for the placement thereon of chairs, tables, etc., or the same may be used to transport a vehicle thereon. If a vehicle is to be supported on the platform, openings 49 are proportionately spaced on the platform area to accommodate the wheels of the vehicle driven onto the platform. Suitable ramps 50 can be employed for bridging the area between the land and water, thus permitting driving a vehicle upon the said platform.

Shown in FIGS. 8 to 10 inclusive of the drawings is a still further modification of a floatation platform which may be employed not only as a pleasure craft when the components thereof have been assembled, but which may be equally employed as a means for supporting a mobile home or the like thereon for transportation over water. The various components forming the floatation platform are essentially the same as that described with reference to FIGS. 1 to 3 of the drawings. However, in order to accommodate for the wheels of the vehicle 51 supported on the platform, the side sections 52, 53 are each provided with cut-out areas 54 which will accommodate the vehicle wheels therein. As indicated by the arrows in FIG. 9 of the drawings, the various components forming the craft are joined together in the manner set forth with respect to FIG. 4 of the drawings. Prior to connecting the stern and bow to the craft, however, the vehicle is driven onto the floatation platform and thereafter the stern and bow are assembled to the platform in the manner previously described. Once the vehicle has been driven onto the central floatation member 10 and properly positioned thereover, suitable connector means extend from the vehicle to engage with floatation member to secure the same to the undercarriage thereof. If the mobile or recreational vehicle 51 is self powered, suitable power connections to be described more fully hereinafter will be made to power the craft from the motive power of the vehicle. In the event the vehicle is not self powered, a suitable power means such as an outboard motor may be mounted on the stern of the craft to propel the same.

Shown in FIGS. 11 and 12 of the drawings are means whereby the wheel wells formed by the cut-out 54 are covered so as to reduce the drag of the wheels in the water when the craft is propelled over the water. FIG. 11 shows a fairing member 56 formed of any suitable material and comprises an upstanding wall extending along the sides of the side sections 52, 53 and are secured to the bow and stern of the craft in any known manner. A suitable anchoring device, not shown, is formed on the undersurface of the floatation member 10 for securing the fairing thereto and fastener 57 extends through the side sections 53, 54 to assist in securing the fairing to the craft. As can be appreciated, the covering of the lower portion of the tire 63 of the vehicle will reduce the drag which would normally be present if the wheels were left uncovered.

Shown in FIG. 12 of the drawings is another manner in which the lower portion of the vehicle wheels may be covered so as to avoid drag imposed by an uncovered wheel when the same extends into the water during movement of the craft. FIG. 12 shows an inflatable ring-like member 58 with a filling stem 59 extending from the inflatable member to a position outwardly of the side sections 52, 53. Recesses 60 and 61 are formed in the bottom portion of one of the floatation components 26 and side sections 52, 53 and mounted within the recesses are rubber ring-like member 58. As can be appreciated, when the ring is inflated, the membrane 62 which is integrally formed with the aforesaid ring will be caused to snugly engage with the vehicle tire 63 to thus encase the same.

Figure 18:
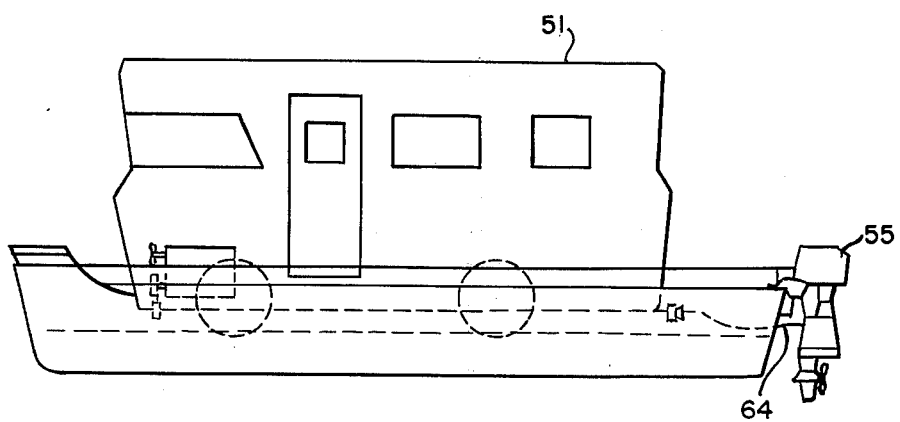

Shown in FIG. 13 of the drawings is a schematic view of the controls which may extend from the vehicle on the floatation platform to provide for steering of the craft as well as to supply the motive power for the craft. As shown, a pair of outboard motors are each mounted on the stern of the craft and a flexible driving cable such as a pair of Bowen wires 64 extend from a source of power derived from the motor of the vehicle and extend to a gearing unit 65 of a conventional outboard type motor 55. Thus, the motive power for the propeller of the outboard motor will be derived from the power source of the vehicle through a power take-off 66 which is belt driven by belt 67 which is trained over pulleys 68 and 69. Pulley 68 is driven by the main shaft of the motor of the vehicle on the craft. To effect a steering arrangement for the craft, flexible lines 70 are secured to the steering mechanism of the motor vehicle and through suitable linkage mechanisms of known construction, the steering mechanism of the vehicle will, by manipulation of the steering wheel thereof, effect a change of direction of travel of the craft by orienting the line of travel of the aforesaid outboard motors. Thus, as viewed in FIG. 18 of the drawings, the mobile or recreational vehicle which has been driven onto the floatation platform will have the aforesaid power and steering lines adequately secured to the outboard motors and as can be appreciated, operation of the power source of the vehicle will effect propulsion of the craft and the same can be steered by employment of the steering mechanism of the vehicle. Suitable plates will be positioned under the front wheels of the vehicle so as to permit for the wheels to turn on the platform when the steering wheel is turned from one position to another. This could also be accomplished by elevating the front of the vehicle by suitable jacking mechanism to raise the wheels above the supporting surface.

Figure 14:
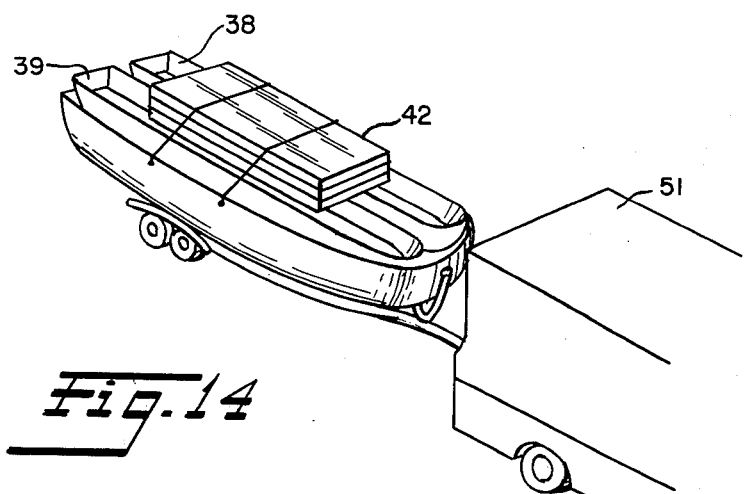
FIG. 14 is a perspective view showing the transport of the components for the floatation platform on a conventional vehicle drawn trailer.
Figure 15:
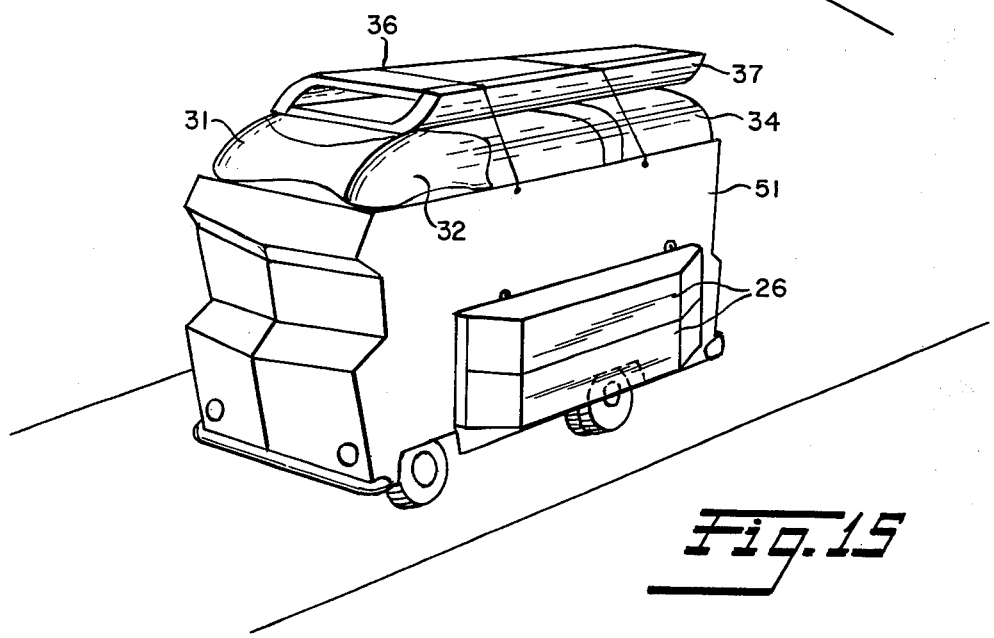
FIG. 15 is a perspective view showing the manner in which the various components for the floatation platform are mounted on a conventional self powered mobile home for transport thereof when the mobile home is travelling on land.
Figure 16:
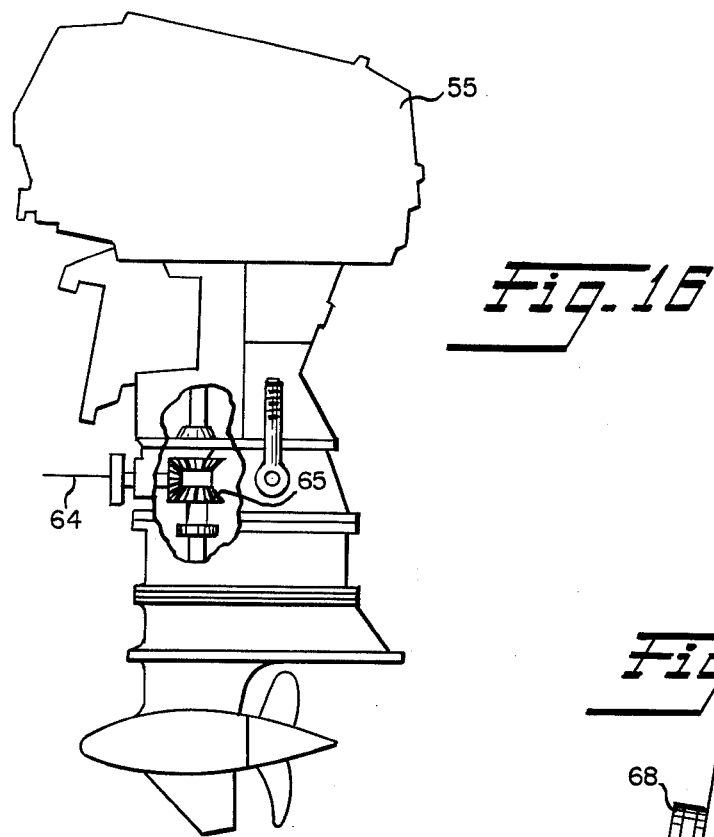
FIG. 16 is a side elevation view with parts broken away, disclosing one type of a power means for the floatation platform.
Figure 17:
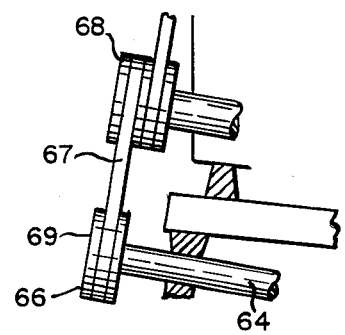
FIG. 17 is a sectional view showing a modification of a drive mechanism of a conventional self powered mobile home employed for propelling the floatation platform ovoer a body of water, and, FIG. 18 is a side elevation view showing the drive from the mobile home to the propulsion unit for the floatation platform.

FIGS. 14 and 15 show manners in which the components employed in the formation of the floatation platform may be transported from one place to another. In FIG. 14, the various components may be strategically mounted on a conventional trailer and suitably lashed thereon. A pulling vehicle will then transport the various components to the sites of assembly for providing a floatation platform. FIG. 15 shows generally how the various components of the platform may be mounted on the roof and sides of the vehicle, in this instance shown as a mobile or recreation home. Some of the components are suitably lashed to the roof portion and the remainder of the components secured in any known manner to the sides of the vehicle. The storing of the components on the roof and on the sides of the vehicle will not increase the height and width of the vehicle beyond what is permissible by law for vehicles travelling on our highways.

Thus, there has been described and illustrated in the drawings a floatation platform capable of a variety of uses. As set forth previously, the various components employed in the formation of a floatation platform can be employed to form a pleasure craft for the floatation and transport of people employing the craft as a pleasure craft, or the components may be so arranged as to form a surface upon which a vehicle may be supported and transported from one place to another over water and also provides for a platform which may be powered for propulsion by conventional outboard motors or from power derived from the vehicle on the platform.

The invention is not to be confined to any strict conformity to the showings in the drawings, but changes or modifications may be made therein so long as such changes or modifications mark no material departure from the spirit and scope of the appended claims.

What is claimed is:

1. A device of the character described to provide a floatation platform for use as a means for floating and transporting a land vehicle to thus convert the same to an amphibious vehicle, said platform comprising a plurality of flotation components shaped to form a sectionalized hull, bow, stern and sides for the said platform, each component including adjacently disposed side walls having a bottom and upper edge, a buoyant material in said hull, bow, stern and sides, cooperating fastener elements extending along the adjacent side walls of each of said components, one of said walls terminating in a shallow area formed integral along the bottom edge of one of the said components and having a wing portion at the upper edge extending over a portion of said buoyant material, the wall of the next adjacent component having a rib at the lower edge thereof and a wing portion at the upper edge thereof extending over a portion of the said buoyant material, said rib nesting within said hollow area when the adjacent components are in assembled relationship, cross beams extending over said assembled components, a leg portion depending from said cross beams, said leg portion extending between the said side walls of said components and into said shallow area and the wall of the next adjacent component having said rib formed thereon, for frictionally retaining said components in assembled relationship, said cross beams having wing portions extending over the wing portions of said walls and means for securing said wing portions on said cross beams to said wing portions on said wall sections.

2. The structure recited in claim 1, wherein the said vehicle is self powered.

3. The structure recited in claim 2, wherein the propulsion and steering for the said platform is derived from the power unit of the vehicle and the steering thereof effected by manipulation of the steering mechanism of the said vehicle.

4. The structure recited in claim 1, wherein the said vehicle provides the power means for propelling said platform.

5. The structure recited in claim 1, wherein the side sections of the floatation platform are each provided with cut-out areas for the reception therein of the wheels of the vehicle supported on the platform and wherein a fairing member extends below the vehicle wheel to thus reduce the drag of the vehicle wheel when the platform is propelled over a body of water.

6. The structure recited in claim 1 wherein cut-outs are provided in said assembled components to receive therein the wheels of the vehicle carried by the floatation platform and a wheel cover extending over the lower portion of each of the said wheels to thus reduce the drag of the wheels when the platform is propelled over a body of water.

7. A device of the character described to provide a flotation platform, said platform comprising a plurality of flotation components shaped to form a hull, bow, stern and sides for the said platform, each component including adjacently disposed side walls having a bottom and upper edge, a buoyant material in said hull, bow, stern and sides, said components each provided with cooperating fastener elements extending along the adjacent side walls of each of said components, one of said walls terminating in a shallow area formed integral along the bottom edge of one of said components and having a wing portion at the upper edge extending over a portion of the said buoyant material, the wall of the next adjacent component having a rib at the lower edge thereof and a wing portion at the upper edge extending over a portion of the said buoyant material, said rib nesting within said shallow area when the adjacent components are in assembled relationships, cross beams extending over said assembled components, a leg portion depending from said cross beams, said leg portion forced into and extending between the said side walls of said components and into said shallow area and the wall of the next adjacent component for frictionally retaining the components in assembled relationships.

8. The structure recited in claim 7, wherein fastening elements extend through said cross beams for engagement with the said wing portions for retaining said components in assembled relationship.

* * * * *